Reissued Jan. 23, 1951 Re. 23,332

UNITED STATES PATENT OFFICE 23,332

ELECTROLYTIC DEPOSITION OF MANGANESE

Paul M. Ambrose, College Park, Md., assignor to Chicago Development Company, Chicago, Ill., a corporation of Illinois No Drawing. Original No. 2,347,451, dated April 25, 1944, Serial No. 276,554, May 31, 1939. Application for reissue December 15, 1944, Serial No. 568,310

10 Claims. (Cl. 204—105)

Matter enclosed in heavy brackets [ ] appears in the original patent but forms no part of this reissue specification; matter printed in italics indicates the additions made by reissue This invention relates to the electrolytic deposition of manganese and is particularly concerned with the production of very high purity electrolytic manganese from aqueous solutions of manganese salts, particularly, manganese, sulphate solutions.

The preparation of electrolytic manganese from electrolytes comprising aqueous solutions of manganese salts such as manganese sulphate, manganese chloride, manganese benzoate, manganese sodium citrate, manganese acetate and other manganese salts has heretofore been proposed. The aqueous electrolytes have been utilized as such or in conjunction with addition agents such as ammonium salts and ethanolamine salts, for example, ammonium sulphate, monoethanolamine sulphate, triethanolamine sulphate, and the like. In addition, the prior art suggested the preliminary purification of the aqueous manganese electrolytes by various methods. Despite all of these efforts to produce fully satisfactory depositions, no one has heretofore successfully produced satisfactorily thick deposits which are substantially free from sulphur. Thus, for example, while good deposits have been reported in connection with the process described in United States Patent No. 2,119,560, the sulphur content of the deposited manganese has ranged from about 0.2% to about 0.3%, representative deposits containing of the order of 0.27%.

The present invention is based upon new discoveries which enable the formation of exceptionally satisfactory deposits of manganese, of good thickness, and of substantial freedom from sulphur. In general, these results are obtained by the utilization of novel methods of purification of manganese electrolyte solutions coupled with proper control of current density and manganese content of the catholyte.

Aqueous catholyte solutions which are employed in the production of electrolytic manganese usually contain relatively large amounts of manganese salts and ammonium salts or salts of organic nitrogenous bases or the like, an illustrative example being of the order of 70 grams of manganese sulphate and 200 grams of ammonium sulphate per liter as major constituents. However, the electrolyte also usually contains small amounts of salts of one or more of the elements iron, nickel, cobalt, molybdenum, vanadium, arsenic, copper, zinc, and lead. These impurities seriously interfere with the production of satisfactory deposits of high-purity electrolytic manganese.

In accordance with the present invention, the principal step of purifying the electrolyte is accomplished by the utilization of a sulphide ion to effect precipitation of nickel, cobalt, copper and zinc, the substantial removal of these metals being apparently particularly essential if manganese deposits of good density and substantial freedom from sulphur are to be obtained. While these metals are effectively removed in accordance with the practice of my invention, other heavy metals are likewise at least substantially eliminated.

It has been found that when a sulphide ion is added, for example, to an aqueous solution of manganese sulphate containing traces of nickel and cobalt and having a hydrogen ion concentration greater than about 6.0, pink manganese sulphide and other heavy metal sulphides are essentially precipitated. If filtration to remove such precipitates is carried out under these conditions, it has been found that the filtrate will not be entirely free of nickel and cobalt. If, however, the solution is permitted to stand for a substantial period of time, at least one hour and preferably several hours in the usual case, the pink manganese sulphide undergoes a change and a black precipitate containing the nickel and cobalt is formed. On filtration, under such conditions, the solution is substantially free from nickel and cobalt.

While good results are obtained by following the procedure described hereinabove, so far as the initial purification step is concerned, it has been found that further improvements result from the addition to the electrolyte of a finely divided material such as infusorial earth, tripoli, activated charcoal, alumina, silica gel, barium sulphate, titanium dioxide, or any other inert material presenting a large surface. This surface may be produced in other ways, for example, as by forming a precipitate in the solution itself, for example, by adding barium sulphide thereto. Exceptionally satisfactory results are obtained by the use of activated charcoal and it is preferred, therefore, to employ this material. The activated charcoal or the like reduces materially the length of time that the precipitate of pink manganese sulphide and other heavy metal sulphides is required to be allowed to stand. Thus, for example, instead of requiring upwardly of an hour and in numerous cases several hours, the addition of activated charcoal or the like reduces the time of standing to only a few minutes, in most instances, to approximately 10 or 15 minutes.

In order to obtain highly pure deposits of electrolytic manganese of desired density, the anode current density should be below twenty amperes per square foot and, for best results, between about sixteen and about eighteen amperes per square foot. Furthermore, the manganese content during electrolysis should be about fifteen grams per liter. In order to accomplish this result, for example, electrolyte containing at least about twenty-five grams per liter of metallic manganese as manganese sulphate may be passed through the cathode compartment at such a rate that the solution leaving the cathode compartment contains of the order of ten grams of metallic manganese as manganese sulphate per liter. Separate anolyte and catholyte circuits are maintained and they may be separated by a relatively impermeable diaphragm if it is not desired to make large amounts of manganese dioxide at the anode.

The following example is illustrative of the practice of my invention. It will be understood that variations may be made with respect to the manganese salt to be electrolyzed, the character of the addition agent or agents, the nature of the cathodes and anodes, current densities and the like, as well as in other ways, all within the scope of the invention in the light of the guiding principles which have been described in detail hereinabove.

To 10,000 liters of an aqueous solution containing 150 grams of ammonium sulphate and 35 grams of metallic manganese as manganese sulphate per liter, said solution containing traces of nickel, iron and cobalt, one pound of colorless ammonium sulphide and one pound of activated charcoal were added. The solution was stirred and then allowed to stand for 15 minutes. The solution was then filtered through a high silicon iron filter press using an ordinary filter cloth. The resulting solution was free from nickel and cobalt as indicated by tests with dimethylglyoxime and alpha nitroso beta naphthol. It is particularly preferred that the pH of the solution be maintained between 7 and 8 although good results may be obtained employing a pH of about 5.5 and about 8.5. The resulting solution is then electrolyzed in a lead lined cell with a heavy canvas diaphragm, sheet steel cathodes and lead anodes, the anode current density utilized being approximately 18 amperes per square foot.

Instead of employing ammonium sulphide, other sulphides may be utilized, it being immaterial in what form the sulphide ion is added. Ammonium sulphide, hydrogen sulphide and barium sulphide are particularly preferred because they do not contaminate the solution. It will be understood that the final, purified solution which is to be electrolyzed, when prepared in accordance with the present invention, contains only the amount of sulphide ion represented by the solubility of manganese sulphide in the particular electrolyte utilized. In general, the sulphide ion is employed in amounts less than or not substantially in excess of, about 1% of the stoichiometric equivalent of the manganese present.

While the practice of the process may be carried out with solutions containing only manganese salts such as manganese sulphate, it is distinctly preferable to employ aqueous electrolytes containing not only manganese salts but also addition agents such as ammonium salts, for example, ammonium sulphate as well as salts of alkylolamines and related compounds. Where ammonium sulphate is utilized, together with manganese sulphate, there should be present at least about 100 grams of ammonium sulphate per liter of electrolyte solution in order to obtain the most satisfactory results.

What I claim as new and desire to protect by Letters Patent of the United States is:

[1. In a method of making high purity manganese which comprises electrolyzing an aqueous solution containing a soluble manganese salt, the steps which comprise adding to said aqueous solution a sulphide ion and an inert, solid material having a high specific surface, the sulphide ion being effective to precipitate such heavy metals as may be present, allowing the solution to stand for a short period of time, and filtering.]

[2. The method defined in claim 1 wherein the inert, solid material comprises activated charcoal.]

[3. The method defined in claim 1 wherein the inert, solid material is activated charcoal, the sulphide ion added is in an amount less than about 1% of the stoichiometric equivalent of the manganese present, the activated charcoal being employed in amounts at least equal to the weight of the added sulphide ion.]

[4. In a process of producing electrolytic manganese which comprises electrolyzing an aqueous solution of manganese sulphate, the steps which comprise adding a member selected from the group consisting of ammonium sulphide, hydrogen sulphide, and barium sulphide to said aqueous solution to precipitate such heavy metals as may be present, adding a finely divided inert material to the solution, allowing the solution to stand for at least about 10 minutes, and then filtering the solution.]

[5. The process defined in claim 4 wherein the aqueous solution of manganese sulphate contains a substantial content of ammonium sulphate.]

[6. In a method of producing electrolytic manganese of high purity which comprises electrolyzing an aqueous solution containing at least 15 grams of manganese as manganese sulphate and at least 100 grams of ammonium sulphate per liter of solution by utilizing an insoluble anode and an anode current density between about 16 and about 20 amperes per square foot, adding ammonium sulphide to said aqueous solution in amounts not substantially in excess of 1% of the stoichiometric equivalent of the manganese present, adding a finely divided inert material to the solution, allowing the solution to stand for at least several minutes, and filtering.]

[7. In a process of producing electrolytic manganese by electrolysis of aqueous solutions of manganese sulphate containing substantial proportions of ammonium sulphate, the steps which comprise adding a sulphide ion to said solutions at a pH between about 7.0 and 8.0, adding activated charcoal, allowing the solution to stand for an appreciable period of time, and filtering to remove the precipitated sulphides of such heavy metal impurities which may be present.]

[8. The method of claim 7 wherein the sulphide ion is incorporated through the addition of a member selected from the group consisting of hydrogen sulphide, ammonium sulphide, and barium sulphide.]

[9. The method of claim 7 wherein the sulphide ion is incorporated through the medium of ammonium sulphide and the filtrate is electrolyzed utilizing an insoluble anode and an anode current density between about 16 amperes and about 20 amperes per square foot, the electrolysis being effected in a diaphragm cell and the manganese electrolyte being continuously circulated through the cathode compartment at such a rate that there is always present therein at least about 15 grams of manganese as manganese sulphate per liter.]

*10. That method of purifying an aqueous manganese solution, containing traces of heavy metal impurities, preparatory to electrolytic recovery of the manganese, which comprises adding to the solution, at a pH between about 5.5 and about 8.5, an inert, solid material having a high specific surface and sulphide ion in an amount sufficient to precipitate the heavy metal impurities but not substantially in excess of 1% of the stoichiometric equivalent of the manganese present; and stirring the solution to hasten precipitation of the heavy metal sulphides.*

*11. That method of purifying an aqueous solution containing manganese sulphate and traces of nickel and cobalt, which is characterized by adding to the solution, at a pH between about 5.5 and about 8.5, sulphide ion in an amount at least sufficient to remove the nickel and cobalt and not substantially in excess of 1 per cent of the stoichiometric equivalent of the manganese present, to form pink manganese sulphide; also, adding to the solution an inert, solid material having a high specific surface; reacting the constituents of the solution long enough for the pink manganese sulphide to undergo a change and form a precipitate containing the nickel and cobalt; and then filtering the solution, preparatory to electrolysis.*

*12. The method, as defined in claim 11, wherein the inert, solid material comprises activated charcoal.*

*13. The method, as defined in claim 11, wherein the inert, solid material comprises finely divided, activated charcoal in an amount at least equal to the weight of the sulphide ion.*

*14. The method, as defined in claim 11, wherein the sulphide ion is selected from the group consisting of ammonium sulphide, hydrogen sulphide and barium sulphide and wherein the precipitating reaction is completed in a few minutes.*

*15. The method, as defined in claim 11, wherein the aqueous solution contains a substantial amount of ammonium sulphate.*

*16. The method, as defined in claim 11, wherein the aqueous solution contains at least 15 grams per liter of manganese, as manganese sulphate and at least 100 grams per liter of ammonium sulphate; and wherein the sulphide ion is provided by adding ammonium sulphide; and wherein the reaction time is at least several minutes.*

*17. The method, as defined in claim 11, wherein the aqueous solution contains at least 15 grams per liter of manganese, as manganese sulphate, and at least 100 grams per liter of ammonium sulphate; and wherein the pH of the solution is maintained between about 7.0 and 8.0; and wherein the inert, solid material is activated charcoal.*

*18. The method, as defined in claim 11, wherein the sulphide ion is selected from the group consisting of hydrogen sulphide, ammonium sulphide and barium sulphide; and wherein the aqueous solution contains at least 15 grams per liter of manganese, as manganese sulphate, and at least 100 grams per liter of ammonium sulphate; and wherein the pH of the solution is maintained between 7.0 and 8.0; and wherein the inert, solid material is activated charcoal.*

*19. In the process of producing electrolytic manganese by electrolysis of an aqueous solution of manganese sulfate containing a substantial proportion of ammonium sulfate, the steps which are characterized by adding sulfide ion to the solution in an amount not in excess of 1% of the stoichiometric equivalent of the manganese present but sufficient to precipitate some pink manganese sulfide at a pH of 7–8; adjusting the pH of the solution to between 7 and 8; reacting the pink sulfide, so formed, with the constituents of the solution long enough for the pink sulfide to undergo a change to a precipitate containing any nickel and cobalt present; adding a finely divided inert solid to the solution; and then filtering and electrolyzing the solution.*

PAUL M. AMBROSE.

REFERENCES CITED

The following references are of record in the file of this patent or the original patent:

UNITED STATES PATENTS

| Number | Name | Date |
|---|---|---|
| 1,069,205 | Thwaites | Aug. 5, 1913 |
| 1,993,761 | Tippins | Mar. 12, 1935 |
| 2,248,092 | Korpium | July 8, 1941 |
| 2,259,418 | Hannay et al. | Oct. 14, 1941 |

OTHER REFERENCES

U. S. Bureau of Mines, Report of Investigation #3406, July 1938, page 8.

Analytical Chemistry, Treadwell and Hall, 7th edition, 1930 (vol. I), pages 183, 184; vol. II, page 165.

Certificate of Correction

Reissue No. 23,332 January 23, 1951

PAUL M. AMBROSE

It is hereby certified that the above numbered patent was erroneously issued to "Chicago Development Company, of Chicago, Illinois, a corporation of Illinois" as assignee, whereas said patent should have been issued to *Crimora Research & Development Corporation, assignee by mesne assignments*; and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*